United States Patent
Yamamoto

(10) Patent No.: US 12,355,041 B2
(45) Date of Patent: Jul. 8, 2025

(54) METHOD FOR PRODUCING SOLID-STATE BATTERY

(71) Applicant: TOYOTA JIDOSHA KABUSHIKI KAISHA, Toyota Aichi-ken (JP)

(72) Inventor: Kunimitsu Yamamoto, Kasugai Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 525 days.

(21) Appl. No.: 17/684,825

(22) Filed: Mar. 2, 2022

(65) Prior Publication Data

US 2022/0285745 A1 Sep. 8, 2022

(30) Foreign Application Priority Data

Mar. 4, 2021 (JP) .................................. 2021-034299

(51) Int. Cl.
*H01M 10/44* (2006.01)
*H01M 50/124* (2021.01)

(52) U.S. Cl.
CPC ....... *H01M 10/44* (2013.01); *H01M 50/1243* (2021.01); *H01M 2220/20* (2013.01)

(58) Field of Classification Search
CPC ............ H01M 10/44; H01M 50/1243; H01M 50/105; H01M 50/124; H01M 2220/20
See application file for complete search history.

(56) References Cited

U.S. PATENT DOCUMENTS

| 2013/0043843 | A1* | 2/2013 | Amiruddin | H01M 4/0447 429/231.95 |
| 2016/0079634 | A1* | 3/2016 | Onodera | H01M 4/0471 429/49 |
| 2020/0280108 | A1* | 9/2020 | Tomar | H01M 10/482 |
| 2020/0343580 | A1* | 10/2020 | Yushin | H01M 10/617 |
| 2021/0257666 | A1* | 8/2021 | Huang | H01M 50/434 |

FOREIGN PATENT DOCUMENTS

| CA | 2288886 | A1 * | 11/1998 | ............ H01M 10/40 |
| CN | 103459312 | A * | 12/2013 | ......... C01B 31/0423 |
| CN | 104620409 | A * | 5/2015 | ............ C09K 21/14 |
| JP | 2013-020881 | A | 1/2013 | |
| JP | 2015-122169 | A | 7/2015 | |
| JP | 2020-068170 | A | 4/2020 | |
| JP | 2020-155301 | A | 9/2020 | |
| WO | WO-2015063588 | A2 * | 5/2015 | .......... H01M 10/052 |

OTHER PUBLICATIONS

Translation of CN 104620409 A (Year: 2015).*

* cited by examiner

*Primary Examiner* — Jeffrey T Carley
(74) *Attorney, Agent, or Firm* — Dinsmore & Shohl LLP

(57) ABSTRACT

To provide a method for producing a solid-state battery configured to suppress capacity reduction due to electrode cracking. A method for producing a solid-state battery comprising: a stack of a cathode, a solid electrolyte layer and an anode in this order, a resin layer coating at least a part of the stack, a metal housing housing the stack and the resin layer, and a gasifying agent disposed between the stack and the metal housing, wherein the solid-state battery production method comprises discharging the solid-state battery to a SOC of 0% and applying a specified temperature to the discharged solid-state battery.

6 Claims, 2 Drawing Sheets

Toluene

METHOD FOR PRODUCING SOLID-STATE BATTERY

CROSS-REFERENCE TO RELATED APPLICATIONS

This application is based upon and claims the benefit of priority of the prior Japanese Patent Application No. 2021-034299 filed Mar. 4, 2021, the entire contents of which are incorporated herein by reference.

TECHNICAL FIELD

The disclosure relates to a method for producing a solid-state battery.

BACKGROUND

Recently, with the rapid spread of information-related devices and communication devices such as personal computers, video cameras and mobile phones, the development of batteries for use as the power source of the devices, is increasingly important. Also, in the automotive industry, etc., the development of high-power and high-capacity batteries for battery electric vehicles or hybrid electric vehicles has been promoted.

Attention is drawn to a solid-state battery since it uses, as the electrolyte disposed between the cathode and the anode, a solid electrolyte in place of a liquid electrolyte containing an organic solvent.

Patent Literature 1 discloses a method for recovering the capacity of an all-solid state battery, in which the method includes the step of manufacturing a second all-solid state battery by applying pressure to a first all-solid battery by an isotropic pressurizing method, and the first all-solid battery is charged and discharged at least one time.

Patent Literature 2 discloses a method of inspecting an all-solid state battery by a voltage drop amount due to a self-discharge of the battery.

Patent Literature 3 discloses that a passivation layer is disposed on the end face of the laminate of an all-solid state battery and the passivation layer contains LiI hydrate.

Patent Literature 1: Japanese Patent Application Laid-Open (JP-A) No. 2020-068170
Patent Literature 2: JP-A No. 2015-122169
Patent Literature 3: JP-A No. 2020-155301

The capacity of a solid-state battery may be reduced by electrode cracking.

SUMMARY

The disclosed embodiment was achieved in light of the above circumstances. An object of the disclosed embodiment is to provide a solid-state battery production method configured to suppress capacity reduction due to electrode cracking.

In a first embodiment, there is provided a method for producing a solid-state battery comprising:
  a stack of a cathode, a solid electrolyte layer and an anode in this order,
  a resin layer coating at least a part of the stack,
  a metal housing housing the stack and the resin layer, and
  a gasifying agent disposed between the stack and the metal housing,
  wherein the solid-state battery production method comprises discharging the solid-state battery to a SOC of 0% and applying a specified temperature to the discharged solid-state battery.

According to the disclosed embodiment, a solid-state battery production method configured to suppress capacity reduction due to electrode cracking, can be provided.

BRIEF DESCRIPTION OF THE DRAWINGS

In the accompanying drawings.

DETAILED DESCRIPTION

Figure 1:
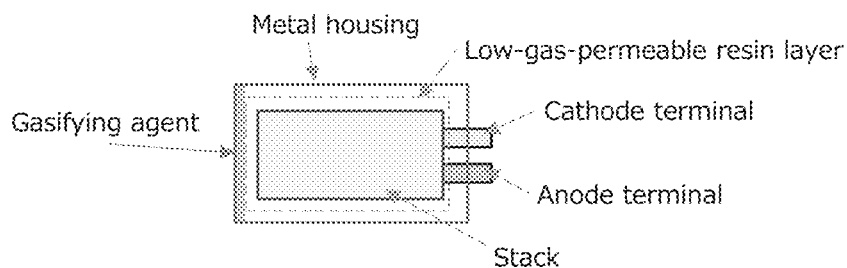
FIG. 1 is a schematic sectional view (in planar direction) of an example of the solid-state battery of the disclosed embodiment.

The solid-state battery production method of the disclosed embodiment is a method for producing a solid-state battery comprising:
  a stack of a cathode, a solid electrolyte layer and an anode in this order,
  a resin layer coating at least a part of the stack,
  a metal housing housing the stack and the resin layer, and
  a gasifying agent disposed between the stack and the metal housing,
  wherein the solid-state battery production method comprises discharging the solid-state battery to a SOC of 0% and applying a specified temperature to the discharged solid-state battery.

In the disclosed embodiments, the state of charge (SOC) value means the percentage of the charge capacity with respect to the full charge capacity of the battery. The full charge capacity is a SOC of 100%.

For example, the SOC may be estimated from the open circuit voltage (OCV) of the solid-state battery.

Electrode cracking is a degradation mode that is specific to solid-state batteries, and it is due to electrode expansion and contraction associated with repeated charging. Capacity degradation is caused by this phenomenon, and it is not recovered unless the cracking becomes conductive again.

In the prior art, when capacity degradation is caused by conductive path blocking that is due to electrode cracking in an end-of-life solid-state battery, the degraded capacity can be recovered by repairing the cracking with use of outside pressure. However, if CIP is used in this method, it is difficult to conduct a capacity recovery process unless the solid-state battery itself is disassembled. To apply isotropic pressure by CIP, a large device is required, and it is impractical to install a CIP device in a vehicle. Accordingly, the capacity of the solid-state battery cannot be recovered as long as the solid-state battery is in the state of being installed in a vehicle.

In the disclosed embodiment, the material for coating the electrode (stack) is limited to a resin with low gas permeability; the resin-coated stack is housed in the metal housing so that the gasifying agent is stored between the resin-coated stack and the metal housing; and as the capacity recovery process, a specified temperature load is applied to the solid-state battery in a discharge state. As a result, the resin coating the periphery of the stack is expanded by evaporation of the gasifying agent, and the crack formed in the stack is filled by the expansion pressure, thereby repairing the conductive path. At that time, as a battery structure, in order to efficiently apply the pressure to the stack, the outside of the resin is surrounded by a strong metal housing. In addition, highly effective recovery of the capacity can be achieved by a temperature load process in the discharge state in which cracking is remarkably occurring. Accordingly, the capacity reduction by electrode cracking is suppressed.

In the case of the solid-state battery in which the stack is coated with two resin layers, the design range of pressure resistance is narrowed since resin expansion depends on a linear expansion coefficient. In the case of the solid-state battery of the disclosed embodiment, however, the size of internal pressure during the application of the specified temperature can be controlled by the amount of the charged gasifying agent, and the pressure resistance can be easily designed compared to the solid-state battery including the two resin layers.

In the solid-state battery of the disclosed embodiment, a space is present between the metal housing and the resin-coated stack. Accordingly, the solid-state battery of the disclosed embodiment has an advantage in production process accuracy over the solid-state battery in which no space is present between the metal housing and the resin-coated stack, and it is easy to produce the solid-state battery of the disclosed embodiment.

FIG. 1 is a schematic sectional view (in planar direction) of an example of the solid-state battery of the disclosed embodiment.

As shown in FIG. 1, the solid-state battery includes a stack including a cathode terminal and an anode terminal, a low-gas-permeable resin layer coating at least a part of the stack, and a gasifying agent. The stack and the low-gas-permeable resin layer are housed in a metal housing. The low-gas-permeable resin layer and the metal housing are not in contact with each other, and a space is formed therebetween. The gasifying agent is disposed in the space. The "planar direction" means a direction perpendicular to the stacking direction.

Figure 2:
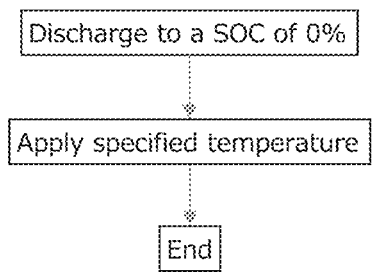
FIG. 2 is a flowchart of an example of the production method of the disclosed embodiment.

FIG. 2 is a flowchart of an example of the production method of the disclosed embodiment.

As shown in FIG. 2, first, the solid-state battery is discharged to a SOC of 0%. Then, the specified temperature is applied to the solid-state battery. As a result, the capacity reduction due to electrode cracking is suppressed, and the solid-state battery with high charge-discharge efficiency is obtained.

Figure 3:
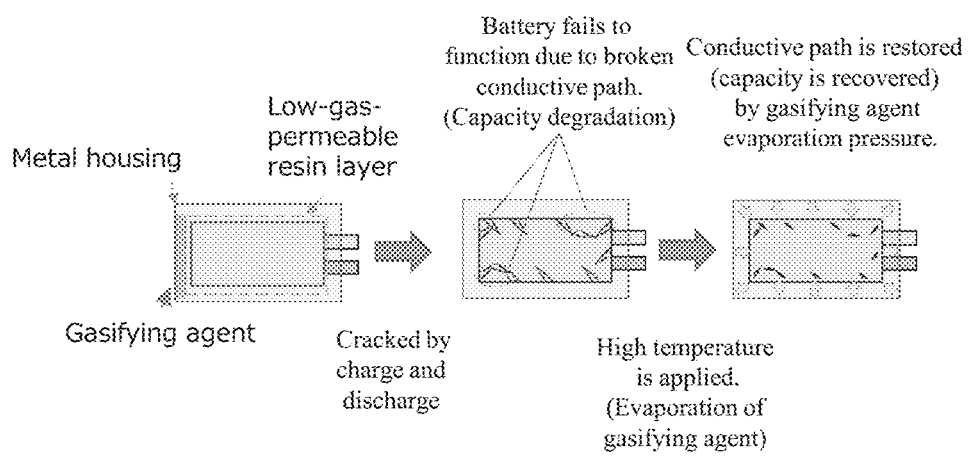
FIG. 3 is a schematic view illustrating the mechanism of the recovery of the capacity of the solid-state battery obtained by the production method of the disclosed embodiment.

FIG. 3 is a schematic view illustrating the recovery mechanism of the capacity of the solid-state battery obtained by the production method of the disclosed embodiment.

As shown in FIG. 3, the solid-state battery is discharged to a SOC of 0%, thereby breaking a conductive path and reducing the capacity of the solid-state battery. Then, the specified temperature is applied to the solid-state battery, thereby evaporating the gasifying agent. By the gasifying agent evaporation pressure from the outside of the stack, the conductive path is restored; the capacity of the solid-state battery is recovered; and the capacity reduction due to electrode cracking is suppressed.

The solid-state battery production method of the disclosed embodiment includes (1) the discharging step and (2) the specified temperature applying step.

(1) Discharging Step

The discharging step is the step of discharging the solid-state battery to a SOC of 0%.

By the discharging step, the amount of electrode void, which is due to the electrode cracking of the solid-state battery, is maximized.

Before the discharging step, the solid-state battery comprising the stack of the cathode, the solid electrolyte layer and the anode in this order, the resin layer coating at least a part of the stack, the metal housing housing the stack and the resin layer, and a gasifying agent disposed between the stack and the metal housing (i.e., a first solid-state battery) is prepared.

(2) Specified Temperature Applying Step

The specified temperature applying step is the step of applying the specified temperature to the discharged solid-state battery.

By the specified temperature applying step, the gasifying agent is evaporated. By the gasifying agent evaporation pressure from the outside of the electrode body, the void of the electrode formed by the electrode cracking is eliminated. By applying the specified temperature, the solid-state battery with recovered capacity (the second solid-state battery) is obtained.

The requirement of the specified temperature may be the maximum temperature among temperatures which are equal to or less than the heatproof temperatures of the battery components and at which the battery is not remarkably degraded.

The temperature at which the battery is not remarkably degraded, can be obtained by the following method, for example: a durability test is conducted at different temperatures to obtain a boundary temperature at which the slope of the Arrhenius plot changes (the temperature of the inflection point in the Arrhenius plot), and the obtained boundary temperature is determined as the temperature at which the battery is not remarkably degraded.

The solid-state battery of the disclosed embodiment comprises:
  the stack of the cathode, the solid electrolyte layer and the anode in this order,
  the resin layer coating at least a part of the stack,
  the metal housing housing the stack and the resin layer, and
  the gasifying agent disposed between the stack and the metal housing.

In the disclosed embodiment, the solid-state battery before the discharging step may be referred to as the first solid-state battery, and the solid-state battery after the specified temperature applying step may be referred to as the second solid-state battery. Since the structure of the first solid-state battery and that of the second solid-state battery are the same structure, the first and second solid-state batteries are collectively referred to as "solid-state battery".

[Resin Layer]

The resin layer is a layer coating at least a part of the stack. As long as the space between the stack and the metal housing can be filled with the gasifying agent (or as long as the gasifying agent can be disposed in the space between the stack and the metal housing), the resin layer may be in contact with or out of contact with the metal housing.

The resin layer may coat at least a part of the stack, or it may coat the sides of the stack.

The resin layer contains a resin. The resin may be a resin that has low or no reactivity with the gasifying agent. The resin may be a resin that does not dissolve in the specified temperature applying step. The resin may be a resin with low gas permeability (a low-gas-permeable resin).

As the resin, examples include, but are not limited to, acrylic resin, epoxy resin and polyvinylidene chloride (PVDC).

[Gasifying Agent]

The gasifying agent is housed in the metal housing and disposed between the metal housing and the stack. More specifically, the gasifying agent is housed in the metal housing and disposed in the region between the inner wall of the metal housing and the stack. The gasifying agent may be housed in the metal housing and disposed in the region between the inner wall of the metal housing and the resin-coated stack.

The gasifying agent may be an agent that has low or no reactivity with resin.

The gasifying agent may be an agent that is not gasified in normal use excluding the specified temperature applying step.

As the gasifying agent, examples include, but are not limited to, toluene and water.

[Metal Housing]

In the metal housing, the gasifying agent is disposed in the region between the metal housing and the stack. In the metal housing, the gasifying agent may be disposed in the region between the metal housing and the resin-coated stack.

The metal housing may be a SUS housing, for example.

[Stack]

The stack includes the cathode, the solid electrolyte layer and the anode in this order.

[Cathode]

The cathode includes a cathode layer and a cathode collector. A cathode terminal may be connected to the cathode, or the cathode collector may be the cathode terminal.

[Cathode Layer]

The cathode layer contains a cathode active material. As optional components, the cathode layer may contain a solid electrolyte, a conductive material, a binder, etc.

There is no particular limitation on the type of the cathode active material, and any material which can be used as an active material of a battery can be employed. When the battery is a lithium secondary battery, as the cathode active material, examples include, but are not limited to, lithium metal (Li), a lithium alloy, $LiCoO_2$, $LiNi_{0.8}Co_{0.15}Al_{0.05}O_2$, $LiNi_xCo_{1-x}O_2$ (0<x<1), $LiNi_{1/3}Co_{1/3}Mn_{1/3}O_2$, $LiMnO_2$, a different element-substituted Li—Mn spinel, lithium titanate, lithium metal phosphate, LiCoN, $Li_2SiO_3$, and $Li_4SiO_4$, a transition metal oxide, $TiS_2$, Si, $SiO_2$, a Si alloy and a lithium storage intermetallic compound. As the different element-substituted Li—Mn spinel, examples include, but are not limited to, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. As the lithium titanate, examples include, but are not limited to, $Li_4Ti_5O_{12}$. As the lithium metal phosphate, examples include, but are not limited to, $LiFePO_4$, $LiMnPO_4$, $LiCoPO_4$ and $LiNiPO_4$. As the transition metal oxide, examples include, but are not limited to, $V_2O_5$ and $MoO_3$. As the lithium storage intermetallic compound, examples include, but are not limited to, $Mg_2Sn$, $Mg_2Ge$, $Mg_2Sb$ and $Cu_3Sb$.

As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. As the Si alloy, examples include, but are not limited to, an alloy of Si and a metal such as Li, and an alloy of Si and at least one kind of metal selected from the group consisting of Sn, Ge and Al.

The form of the cathode active material is not particularly limited. It may be a particulate form. When the cathode active material is in a particulate form, the cathode active material may be primary particles or secondary particles. The average particle diameter (D50) of the cathode active material may be 1 nm or more and 100 μm or less, or it may be 10 nm or more and 30 μm or less, for example.

On the surface of the cathode active material, a coating layer containing a Li ion conductive oxide may be formed. This is because a reaction between the cathode active material and the solid electrolyte can be suppressed.

As the Li ion conductive oxide, examples include, but are not limited to, $LiNbO_3$, $Li_4Ti_5O_{12}$, and $Li_3PO_4$. The thickness of the coating layer is, for example, 0.1 nm or more, and it may be 1 nm or more. On the other hand, the thickness of the coating layer is, for example, 100 nm or less, and it may be 20 nm or less. The coating rate of the coating layer on the surface of the cathode active material is, for example, 70% or more, and it may be 90% or more.

As the solid electrolyte, examples include, but are not limited to, those exemplified below in [Solid electrolyte layer].

The amount of the solid electrolyte contained in the cathode layer is not particularly limited. It may be within a range of, for example, from 1 mass % to 80 mass % of the total mass (100 mass %) of the cathode layer.

As the conductive material, a known material can be used, such as a carbon material and metal particles. As the carbon material, examples include, but are not limited to, at least one selected from the group consisting of acetylene black, furnace black, VGCF, carbon nanotube and carbon nanofiber. Among them, at least one selected from the group consisting of VGCF, carbon nanotube and carbon nanofiber may be used, from the viewpoint of electron conductivity. As the metal particles, examples include, but are not limited to, particles of Ni, Cu, Fe and SUS.

The amount of the conductive material contained in the cathode layer is not particularly limited.

As the binder, examples include, but are not limited to, acrylonitrile butadiene rubber (ABR), butadiene rubber (BR), polyvinylidene fluoride (PVdF) and styrene butadiene rubber (SBR). The amount of the binder contained in the cathode layer is not particularly limited.

The thickness of the cathode layer is not particularly limited.

The cathode layer can be formed by a conventionally known method.

For example, the cathode active material and, as needed, other components are put in a solvent; they are stirred to prepare a slurry for a cathode layer; and the slurry for the cathode layer is applied on one surface of a support such as a cathode collector; and the applied slurry is dried, thereby obtaining the cathode layer.

As the solvent, examples include, but are not limited to, butyl acetate, butyl butyrate, heptane, and N-methyl-2-pyrrolidone (NMP).

The method for applying the slurry for the cathode layer on one surface of the support such as the cathode collector, is not particularly limited. As the method, examples include, but are not limited to, the doctor blades method, the metal mask printing method, the static coating method, the dip coating method, the spread coating method, the roll coating method, the gravure coating method, and the screen printing method.

As the support, one having self-supporting property can be appropriately selected and used without particular limitation. For example, a metal foil such as Cu and Al can be used.

As another method for forming the cathode layer, the cathode layer may be formed by pressure molding a cathode mixture powder containing the cathode active material and, as needed, other components. In the case of pressure molding the cathode mixture powder, generally, a press pressure of about 1 MPa or more and 600 MPa or less is applied.

The method for applying the pressure is not particularly limited. As the method, examples include, but are not limited to, a pressure applying method using a plate press machine, a roll press machine, or the like.

[Cathode Collector]

As the cathode collector, a known metal that can be used as the collector of a battery, can be used. As the metal, examples include, but are not limited to, a metal material containing one or more elements selected from the group consisting of Cu, Ni, Al, V, Au, Pt, Mg, Fe, Ti, Co, Cr, Zn, Ge and In. As the cathode collector, examples include, but are not limited to, SUS, aluminum, nickel, iron, titanium and carbon.

The form of the cathode collector is not particularly limited. As the form, examples include, but are not limited to, various kinds of forms such as a foil form and a mesh form. The thickness of the cathode collector varies depending on the shape. For example, it may be in a range of from 1 μm to 50 μm, or it may be in a range of from 5 μm to 20 μm.

The cathode collector may be connected to the cathode terminal, or the cathode collector may be the cathode terminal.

[Anode]

The anode includes an anode collector and an anode layer. An anode terminal may be connected to the anode, or the anode collector may be the anode terminal.

[Anode Layer]

The anode layer contains at least an anode active material. As needed, it contains an electroconductive material, a binder, a solid electrolyte, etc.

As the anode active material, examples include, but are not limited to, graphite, mesocarbon microbeads (MCMB), highly oriented pyrolytic graphite (HOPG), hard carbon, soft carbon, elemental lithium, a lithium alloy, elemental Si, a Si alloy and $Li_4Ti_5O_{12}$. As the lithium alloy and the Si alloy, those exemplified above as the cathode active material may be used.

The form of the anode active material is not particularly limited. As the form, examples include, but are not limited to, a particulate form and a plate form. When the anode active material is in a particulate form, the anode active material may be primary particles or secondary particles. The average particle diameter (D50) of the anode active material may be 1 nm or more and 100 μm or less, or it may be 10 nm or more and 30 μm or less, for example.

As the electroconductive material and binder used in the anode layer, those exemplified above as the electroconductive material and binder used in the cathode layer, may be used. As the solid electrolyte used in the anode layer, those exemplified below as the solid electrolyte used in the solid electrolyte layer, may be used.

The thickness of the anode layer is not particularly limited. For example, it may be from 10 μm to 100 μm.

The amount of the anode active material contained in the anode layer is not particularly limited. It may be from 20 mass % to 90 mass %, for example.

[Anode Current Collector]

The material for the anode current collector may be a material that is not alloyed with Li, such as SUS, Cu and Ni. As the form of the anode current collector, examples include, but are not limited to, a foil form and a plate form. The plan-view shape of the anode current collector is not particularly limited, and examples thereof include, but are not limited to, a circular shape, an ellipse shape, a rectangular shape and any arbitrary polygonal shape. The thickness of the anode current collector varies depending on the shape. For example, it may be in a range of from 1 μm to 50 μm, or it may be in a range of from 5 μm to 20 μm.

The anode collector may be connected to the anode terminal, or the anode collector may be the anode terminal.

[Solid Electrolyte Layer]

The solid electrolyte layer contains at least a solid electrolyte.

As the solid electrolyte contained in the solid electrolyte layer, a conventionally-known solid electrolyte that is applicable to solid-state batteries can be appropriately used, such as an oxide-based solid electrolyte and a sulfide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. Note that the description "$Li_2S$—$P_2S$" means a material consisting of a raw material composition including $Li_2S$ and $P_2S_5$, and the same applies to other descriptions. Also, "X" of the above-described LiX indicates a halogen element. The raw material composition may contain one or two or more kinds of LiX. When two or more kinds of LiX are contained, the mixing ratio of the two or more kinds of LiX is not particularly limited.

The molar ratio of the elements in the sulfide-based solid electrolyte can be controlled by adjusting the amounts of the elements in the raw material. Also, the molar ratio and composition of the elements in the sulfide-based solid electrolyte can be measured by ICP emission spectrometry, for example.

The sulfide-based solid electrolyte may be a sulfide glass, a crystalline sulfide glass (glass ceramic) or a crystalline material obtained by carrying out a solid-phase reaction treatment on the raw material composition.

The crystal state of the sulfide-based solid electrolyte can be confirmed, for example, by carrying out powder X-ray diffraction measurement using CuKα rays on the sulfide-based solid electrolyte.

The sulfide glass can be obtained by carrying out an amorphous treatment on the raw material composition such as a mixture of $Li_2S$ and $P_2S_5$. As the amorphous treatment, examples include, but are not limited to, mechanical milling.

The glass ceramic can be obtained, for example, by heat-treating a sulfide glass.

The heat treatment temperature may be a temperature higher than the crystallization temperature (Tc) observed by thermal analysis measurement of the sulfide glass, and it is generally 195° C. or more. On the other hand, the upper limit of the heat treatment temperature is not particularly limited.

The crystallization temperature (Tc) of the sulfide glass can be measured by differential thermal analysis (DTA).

The heat treatment time is not particularly limited, as long as the desired crystallinity of the glass ceramic is obtained. For example, it is within a range of from one minute to 24 hours, and it may be within a range of from one minute to 10 hours.

The heat treatment method is not particularly limited. As the heat treatment method, examples include, but are not limited to, a heat treatment method using a firing furnace.

As the oxide-based solid electrolyte, examples include, but are not limited to, a substance having a garnet-type crystal structure including, for example, a Li element, a La element, an A element (A is at least one of Zr, Nb, Ta and Al) and an O element. The oxide-based solid electrolyte may be $Li_{3+x}PO_{4-x}N_x$ (1≤x≤3), for example.

The form of the solid electrolyte may be a particulate form, from the viewpoint of good handleability.

The average particle diameter (D50) of the solid electrolyte particles is not particularly limited. The lower limit of the average particle diameter may be 0.5 μm or more, and the upper limit may be 2 μm or less.

In the disclosed embodiment, the average particle diameter of the particles is the value of a volume-based median diameter (D50) measured by laser diffraction and scattering particle size distribution measurement, unless otherwise noted. In the disclosed embodiment, the median diameter (D50) is a diameter (volume average diameter) such that the cumulative volume of the particles is half (50%) of the total volume when the particles are arranged in order of particle diameter from smallest to largest.

The solid electrolyte may be one kind of solid electrolyte, or it may be 2 or more kinds of solid electrolytes. In the case of using 2 or more kinds of solid electrolytes, they may be mixed together, or they may be formed into layers to obtain a multilayer structure.

The amount of the solid electrolyte in the solid electrolyte layer is not particularly limited. For example, it may be 50 mass % or more; it may be within a range of 60 mass % or more and 100 mass % or less; it may be within a range of 70 mass % or more and 100 mass % or less; or it may be 100 mass %.

A binder may also be contained in the solid electrolyte layer, from the viewpoint of expressing plasticity, etc. As the binder, examples include, but are not limited to, materials exemplified above as the binder used in the cathode layer. However, to facilitate high output, the binder contained in the solid electrolyte layer may be 5 mass % or less, from the viewpoint of preventing excessive aggregation of the solid electrolyte and enabling the formation of the solid electrolyte layer in which the solid electrolyte is uniformly dispersed.

As the method for forming the solid electrolyte layer, examples include, but are not limited to, pressure molding a solid electrolyte material powder containing a solid electrolyte. In the case of pressure molding the solid electrolyte material powder, generally, a press pressure of about 1 MPa or more and 600 MPa or less is applied.

The method for applying the pressure is not particularly limited. As the method, examples include, but are not limited to, the pressure applying method exemplified above in the formation of the cathode layer.

The thickness of the solid electrolyte layer is not particularly limited. In general, it is 0.1 μm or more and 1 mm or less.

The solid-state battery may be a primary or secondary battery. The solid-state battery may be a secondary battery, because a secondary battery is rechargeable and useful as a car battery, for example. Also, the solid-state battery may be a solid-state lithium secondary battery.

EXAMPLES

Example 1

A stack was prepared by stacking a cathode collector foil, a cathode layer, a solid electrolyte layer, an anode layer, and an anode collector foil in this order.

The structure of the stack is as described below.
Cathode collector foil: Al (thickness t=15 μm)
Cathode layer: NCM ($LiNi_{1/3}Co_{1/3}Mn_{1/3}O_2$ (cathode active material))/Solid electrolyte/PVdF (binder) at a ratio of 80/15/5 (in wt. %)
Anode layer: Si (anode active material)/Solid electrolyte/SBR (binder) at a ratio of 50/48/2 (in wt. %)
Anode collector foil: Cu (thickness t=15 μm)
Solid electrolyte layer: Sulfide-based solid electrolyte A solid-state battery was obtained by the following method.

The periphery of the stack was coated with epoxy resin (thickness 4 mm). The coating resin was solidified to form a resin layer on the periphery of the stack. The stack and the resin layer were inserted into a metal housing (SUS housing). As a gasifying agent, toluene (5 cc) was injected into a space between the stack in the SUS housing and the inner wall of the SUS housing, thereby obtaining the solid-state battery.

Figure 4:
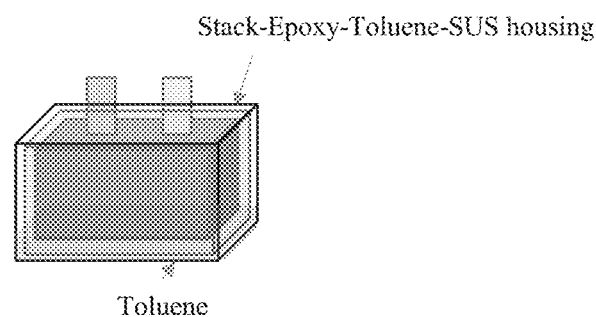
FIG. 4 is a schematic view of the solid-state battery (stack-epoxy resin-toluene-SUS housing) of Example 1.

FIG. 4 is a schematic view of the solid-state battery (stack-epoxy resin-toluene-SUS housing) of Example 1.

[Evaluation Method]
The following durability test was conducted on the solid-state battery of Example 1 to measure capacity retention rates. The results are shown in Table 1.

[Discharge Capacity Measurement Before Durability Test]
In an unrestrained state, the solid-state battery obtained in Example 1 was charged at 25° C. and 0.1 C from a SOC of 0% to 100% and discharged at 0.1 C from a SOC of 100% to 0%, thereby measuring the discharge capacity of the solid-state battery before the durability test.

[Durability Test]
Charging at 1 C from a SOC of 0% to 100% and discharging at 1 C from a SOC of 100% to 0%, were considered as one cycle. In the condition of 25° C., the solid-state battery obtained in Example 1 was charged and discharged for a total of 100 cycles.

[Discharge Capacity Measurement after Durability Test]
After the durability test, the solid-state battery obtained in Example 1 was charged at 25° C. and 0.1 C from a SOC of 0% to 100% and discharged at 0.1 C from a SOC of 100% to 0%, thereby measuring the discharge capacity of the solid-state battery after the durability test.

The discharge capacity of the solid-state battery after the durability test was divided by the discharge capacity before the durability test. The resultant was multiplied by 100, thereby calculating the capacity retention rate of the solid-state battery. A result indicating the capacity retention rate of Example 1 just after the cycle test, is shown in Table 1, which is a capacity retention rate when the below-described capacity retention rate of Comparative Example 1 just after the cycle test is considered as 100%.

[Discharging Step]
After the calculation of the capacity retention rate, as the discharging step, the SOC of the solid-state battery was controlled to 0%.

[Specified Temperature Applying Step]

Next, as the specified temperature applying step, the solid-state battery was exposed to the excess temperature of the battery, which was set to 130° C., for 30 minutes. Then, the capacity retention rate was measured again. Also, as the specified temperature applying step, the solid-state battery was exposed to the proper temperature of the battery, which was set to 120° C., for 30 minutes. Then, the capacity retention rate was measured again. A result indicating the capacity retention rate of Example 1 after the application of the excess temperature and a result indicating the capacity retention rate of Example 1 after the application of the proper temperature, are shown in Table 1, both of which are capacity retention rates when the below-described capacity retention rate of Comparative Example 1 just after the cycle test is considered as 100%.

The excess temperature was determined in consideration of the degradation temperature limit of the solid-state battery.

Comparative Example 1

A solid-state battery was obtained in the same manner as Example 1, except that the resin layer was not formed on the periphery of the stack, and the stack was inserted into the SUS housing whose inside was insulated with tape to prevent the stack from contact with the SUS housing.

Figure 5:
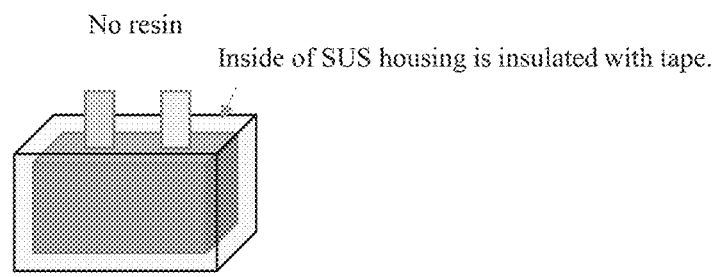
FIG. 5 is a schematic view of the solid-state battery (stack-tape-SUS housing) of Comparative Example 1.

FIG. 5 is a schematic view of the solid-state battery (stack-tape-SUS housing) of Comparative Example 1.

The durability test was conducted on the solid-state battery of Comparative Example 1 in the same manner as Example 1 to measure capacity retention rates. A result indicating the capacity retention rate of Comparative Example 1 after the application of the excess temperature and a result indicating the capacity retention rate of Comparative Example 1 after the application of the proper temperature, are shown in Table 1, both of which are capacity retention rates when the capacity retention rate of Comparative Example 1 just after the cycle test is considered as 100%.

Comparative Example 2

Coating with Two Resin Layers

A solid-state battery was obtained in the same manner as Example 1, except for the following points: the periphery of the stack was coated with epoxy resin, and the epoxy resin was solidified to form a first thermal expansion resin layer on the periphery of the stack; the periphery was further coated with acrylic resin, and the acrylic resin was solidified to form a second thermal expansion resin layer on the first thermal expansion resin layer; and they were inserted into the SUS housing. The total thickness of the first and second thermal expansion resin layers is 4 mm. A space was formed between the second thermal expansion resin layer and the SUS housing to prevent the second thermal expansion resin layer and the SUS housing from contact with each other.

Figure 6:
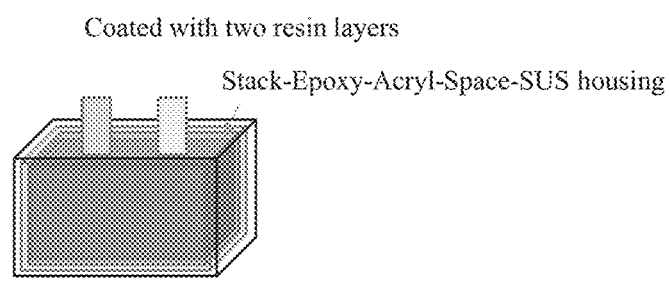
FIG. 6 is a schematic view of the solid-state battery (stack-epoxy resin-acrylic resin-space-SUS housing) of Comparative Example 2.

FIG. 6 is a schematic view of the solid-state battery (stack-epoxy resin-acrylic resin-space-SUS housing) of Comparative Example 2.

The durability test was conducted on the solid-state battery of Comparative Example 2 in the same manner as Example 1 to measure capacity retention rates. A result indicating the capacity retention rate of Comparative Example 2 after the application of the excess temperature and a result indicating the capacity retention rate of Comparative Example 2 after the application of the proper temperature, are shown in Table 1, both of which are capacity retention rates when the capacity retention rate of Comparative Example 1 just after the cycle test is considered as 100%.

TABLE 1

| Level | Capacity retention rate compared to Ref (Just after the cycle test) | Capacity retention rate compared to Ref (Excess temperature load applied) | Capacity retention rate compared to Ref (Proper temperature load applied) |
| --- | --- | --- | --- |
| Comparative Example 1 | 100% (Ref) | 83% | 100% |
| Comparative Example 2 | 101% | 95% | 101% |
| Example 1 | 100% | 98% | 110% |

[Evaluation Results]

It was confirmed that the capacity retention rate of the solid-state battery of Example 1 after the application of the excess temperature and that of the solid-state battery of Example 1 after the application of the proper temperature, are higher than those of the solid-state batteries of Comparative Examples 1 and 2. Accordingly, it was demonstrated that a reduction in solid-state battery capacity is suppressed by the production method of the disclosed embodiment.

The invention claimed is:

1. A method for producing a solid-state battery comprising:
    a stack of a cathode, a solid electrolyte layer and an anode in this order,
    a resin layer coating at least a part of the stack,
    a metal housing which houses the stack and the resin layer, and
    a gasifying agent disposed between the resin layer and the inner wall of the metal housing,
    wherein the gasifying agent comprises water, toluene, or both water and toluene,
    wherein the solid-state battery production method comprises:
        discharging the solid-state battery to a state of charge (SOC) of 0%; and
        applying a specified temperature to the discharged solid-state battery to evaporate the gasifying agent and pressurize the stack, thereby restoring a conductive path of the solid-state battery.

2. The method for producing the solid-state battery according to claim 1, wherein the gasifying agent comprises toluene.

3. The method for producing the solid-state battery according to claim 1, wherein the gasifying agent comprises water.

4. The method for producing the solid-state battery according to claim 1, wherein the resin layer and the metal housing are not in contact with each other.

5. The method for producing the solid-state battery according to claim 1, wherein the resin layer comprises a resin that does not dissolve when applying the specified temperature to the discharged solid-state battery.

6. The method for producing the solid-state battery according to claim 1, wherein the resin layer comprises an epoxy resin.

* * * * *